United States Patent
Flowers

(10) Patent No.: US 6,525,130 B1
(45) Date of Patent: Feb. 25, 2003

(54) POLYMERIZATION OF SILICONE IN A SURFACTANT MEDIUM

(75) Inventor: Robert C. Flowers, Archdale, NC (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 09/961,845

(22) Filed: Sep. 24, 2001

(51) Int. Cl.[7] .............................. C08L 83/04; B01F 3/08; C08F 2/24
(52) U.S. Cl. ..................... 524/588; 524/837; 516/55; 526/60; 528/12; 528/20; 528/33; 528/34
(58) Field of Search .............................. 526/60; 516/55; 524/588, 837; 528/12, 20, 33, 34

(56) References Cited

U.S. PATENT DOCUMENTS

| | | | | |
|---|---|---|---|---|
| 4,277,382 A | * | 7/1981 | Lin et al. ..................... | 428/378 |
| 4,509,981 A | * | 4/1985 | Sanders et al. ........ | 106/287.11 |
| 5,037,878 A | * | 8/1991 | Cerles et al. ................ | 524/588 |
| 5,234,495 A | * | 8/1993 | Breneman et al. ....... | 106/287.1 |
| 5,302,335 A | * | 4/1994 | Naganawa et al. ......... | 264/333 |
| 5,817,714 A | * | 10/1998 | Graiver et al. ................ | 516/55 |

* cited by examiner

*Primary Examiner*—Robert Dawson
*Assistant Examiner*—Jeffrey B. Robertson
(74) *Attorney, Agent, or Firm*—Mark L. Weber; Robert F. Rywalski

(57) ABSTRACT

A process for producing a polymerized silicone fluid comprises the steps of charging to a reaction vessel a hydroxy-terminated silicone fluid, an ethoxy-or methoxy-terminated functional silane, a basic catalyst, and a surfactant package having a cloud point of between 2 to 20° C. below the reaction temperature needed to react the functional silane with the hydroxy-terminated silicone fluid; heating the contents of the reaction vessel to a temperature that is about 2 to about 20° C. above the cloud point of the surfactant package to copolymerize the silicone fluid and functional silane; terminating the copolymerization reaction; and diluting the product with water to form an emulsion.

14 Claims, No Drawings

POLYMERIZATION OF SILICONE IN A SURFACTANT MEDIUM

TECHNICAL FIELD

The present invention relates generally to the polymerization of silicone fluids. More particularly, the present invention relates to the copolymerization of silicone fluids and functional silanes in a surfactant medium using a basic catalyst. The functional silanes are generally substituted methoxy- or ethoxy-silanes.

BACKGROUND OF THE INVENTION

Polymerized silicones have many useful applications. They may be employed as fabric softeners, lubricants, release agents/coatings for adhesives, and waterproofing applications, to name a few. According to the targeted application, the silicone polymerization may be functionalized with particular silanes that provide the silicone polymerization with properties beneficial to that chosen application. Particularly, silicone fluids and silanes are copolymerized to provide a compound useful for a given application. To aid in handling and use, such copolymerizations are typically provided as an emulsion.

Typical reactions for the copolymerization of silicone fluids and silanes employ either cyclic silicone fluids or hydroxy-terminated silicone fluids together with functional silanes in an esterification reaction. These reactions are carried out in an alcohol medium with platinum or other similar metal catalyst. Isopropylanol or methanol is usually added at the beginning of the reaction to function as a diluent to reduce viscosity and aid in the polymerization process. After the polymerization is complete and the fluid has been produced, the alcohol is stripped and the catalyst is filtered out for reuse.

This process produces strong corrosive acids that are damaging to the equipment and the environment. Additionally, the platinum and/or Group VIII metal-based catalysts typically employed are expensive, and the need for stripping solvents, alcohols, viscosity modifiers, and other undesired diluents further increase the production costs. Such silicone fluid production is indicated in U.S. Pat. Nos. 5,352,751, 5,391,674, 5,852,110, and 5,837,784.

To produce a silicone emulsion after the silicone fluid has been produced, the fluid must be emulsified in a separate step using a surfactant package for emulsification. The emulsification process can be carried out through either mechanical or chemical methods. These types of emulsion systems and procedures have been taught in U.S. Pat. Nos. 6,013,682, 5,817,714, and 5,304,621. Notably, in the prior art, polymerization of the silicone fluid occurs in a medium separate from that required to emulsify the final product, and, between the polymerization and emulsification steps, solvents, alcohols, viscosity modifiers, and other undesired diluents must be stripped from the polymerization product before emulsification is begun. Thus, there exist a need in the art for a process for polymerizing and emulsifying a silicone in a surfactant medium, which process does not require stripping the surfactants, alcohols, viscosity modifiers or other undesired diluents, thereby decreasing the necessary process steps.

SUMMARY OF INVENTION

The process of this invention is also an esterification, but proceeds by polymerizing a silicone fluid and functional silane in a surfactant medium that allows for emulsification of the copolymerized final product for commercial use. Because polymerization and emulsification occur in the same medium, this reaction does not require stripping solvents, alcohols, viscosity modifiers, or other undesired diluents. Additionally, the present process does not employ heavy metal catalysts, such as platinum and other, expensive Group VIII metals. The same functional silanes and hydroxy-terminated silicone fluids employed in polymerizations of the prior art may be employed in the present invention; however, the present process yields a pre-emulsified silicone fluid that is cleaner and free of heavy metal catalyst. This process can be carried out in a single vessel instead of multiple vessels, and produces a final product that meets or exceeds commercial standards for silicone fluids. The final silicone fluid emulsion performs equal to or better than currently available commercial silicone fluid products. Additionally, these advantages are accomplished with reduced potential for adverse environmental impact.

In general, the present invention provides a process for producing a polymerized silicone fluid comprising the steps of charging to a reaction vessel a hydroxy-terminated silicone fluid, an ethoxy-or methoxy-terminated functional silane, a basic catalyst, and a surfactant package having a cloud point of between 2 to 20° C. below the reaction temperature needed to react the functional silane with the hydroxy-terminated silicone fluid; heating the contents of the reaction vessel to a temperature that is about 2 to about 20° C. above the cloud point of the surfactant package to copolymerize the silicone fluid and functional silane; terminating the copolymerization reaction; and diluting the product with water to form an emulsion.

Thus, in the process of this invention, the silicone fluid and functional silanes are polymerized in a surfactant package that allows for the subsequent emulsification of the polymerized silicone fluid upon the addition of water, without the need for stripping solvents, alcohols, viscosity modifiers, or other diluents.

PREFERRED EMBODIMENT FOR CARRYING OUT THE INVENTION

As mentioned, the present invention provides an emulsified silicone fluid by copolymerizing, within a surfactant medium, a silicone fluid and functional silanes. The polymerization is effected by a basic catalyst that is neutralized after copolymerization of the silicone fluid and functional silanes. Once the polymerization reaction is terminated and the catalyst is neutralized, the polymerization product is diluted with water and agitated to form an emulsion. The process disclosed herein is desirable over processes of the prior art in that the copolymerization of the silicone fluid and the emulsification of the polymerization product occur in the same medium (a surfactant medium) such that the production of the emulsified product does not require stripping steps.

The selection of suitable hydroxy-terminated silicone fluids for use in this invention is limited to those fluids capable of mixing with the other components during polymerization. This ability to mix will typically be affected by the hydroxy-terminated silicone fluid's viscosity, which generally relates to the molecular weight of the silicone fluid. Preferably, the viscosity of the hydroxy-terminated silicone fluid ranges from about 80 to about 2500 centistoke (cs). Such viscosities are typical for silicone softeners or lubricants found in the market.

The higher the viscosity of the silicone fluid, the shorter the reaction time necessary to achieve the desired viscosity in the final product. Additionally, the A-B repeating block structure and the degree of functionality of the copolymer product will differ based upon the molecular weight of the hydroxy-terminated silicone fluid. The A-B block structure will affect both product performance and the type and amount of surfactants chosen for polymerization and eventual emulsification. Each of these factors should be considered, and the proper starting reagents should be chosen at the start of the polymerization in order to achieve the desired end product.

Due to the high viscosity of some hydroxy-terminated silicone fluids, it is necessary to select surfactants and silanes that allow for proper agitation during polymerization. For instance, high viscosity hydroxy-terminated silicone fluids require the presence of tridecyl alcohol surfactants to aid in viscosity control during polymerization. The presence of low molecular weight silanes may also help in the initial mixing of the components before polymerization starts. Also, the use of hydroxy-terminated silicone fluids of differing viscosities will achieve different end use properties in the polymerized silicone fluid. For example, in textile applications, a 100 cs hydroxy-terminated silicone fluid will produce a product that has a softer hand than that of a 2000 cs hydroxy-terminated silicone fluid. However, the 2000 cs fluids will give hand with fuller feel.

Non-limiting examples of useful hydroxy-terminated silicone fluids may be chosen according to the following Formula (I);

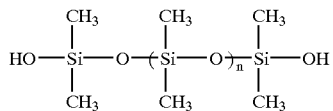

Wherein "n" is from 3 to about 20, although other hydroxy-terminated silicone fluids may be employed within the scope of the present invention. Notably, silicone fluids according to the foregoing Formula (I) will have viscosity in the aforementioned range of from 80 to about 2500 cs.

The functional silanes are chosen to meet a number of factors dictated by desired end use performance. Factors that are of significance include the degree of reactivity in the finished product, the type of reactivity (i.e. type of functional group), the A-B block structure, and the desire for either linear or branched final products. Finally, the choice of functional silanes may affect the potential choices for surfactants to be used as the polymerization medium.

In this invention, functional silanes are generally chosen from substituted methoxy- and ethoxy-silanes, it being understood that the methoxy and ethoxy groups react with the hydroxy-termination of the silicone fluid. Particularly useful functional silanes include amino-functional, epoxy-functional, fluoro-functional, vinyl-functional, acrylo-functional, and phenyl-functional methoxy- and/or ethoxy-silanes. More generally, useful non-limiting examples of methoxy functional silanes may be chosen according to the following formulae (II) and (III):

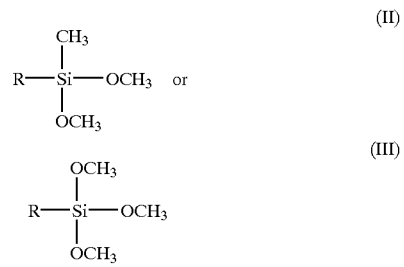

wherein R may be any organic or inorganic functional group. Other useful silanes may include acetoxy-functional, allyl-functional, butyl-functional, chloro-functional, cyano-functional, and mercapto-functional methoxy silanes.

Useful non-limiting examples of ethoxy functional silanes may be chosen according to the following formulae (IV) and (V):

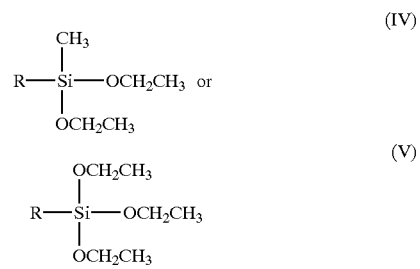

wherein R may be any organic or inorganic functional group. Other useful silanes may include acetoxy-functional, allyl-functional, butyl-functional, chloro-functional, cyano-functional, and mercapto-functional ethoxy silanes.

Amino-functional and epoxy-functional silanes are known and recognized for their use in making different silicone polymers that have different applications and performance characteristics. Amino-functional silanes are generally used to soften or modify the feel of a textile or non-woven substrate. Epoxy-functional silanes are generally used like amino-functional silanes, but they yield a lower degree of softness with a higher degree of lubricity or lower coefficient of friction. Thus, epoxy-functional silanes are generally recognized as better lubricants than softeners. Amino-functional silanes are employed when it is desired to provide a silicone emulsion that gives maximum softener or drape to a substrate, and when discoloration is not a factor. Epoxy-functional silanes are used when it is desired to provide a silicone emulsion that gives a high degree of lubricity and surface slickness.

Fluoro-functional silanes may also be employed, and are shown herein to have unique soil release characteristics and compatibility with fluorochemical repellent systems. Fluoro-functional silanes are a special class of silanes exhibiting excellent soil release or soil repellent properties. These silane systems will soften fluorochemical applications while allowing excellent performance of other fluorochemical additives. Thus, fluoro-functional silanes are employed when it is desired to provide a silicone emulsion that exhibits repellency, and/or very low surface tension, and/or does not interfere with other fluorochemical compounds.

Non-limiting examples of useful amino-functional silanes include n-(2-aminoethyl)-3-aminopropylmethyldimethoxy silane, n-(2-aminoethyl-3-aminopropyl)trimethoxy silane, 3-aminopropylmethyldiethoxy silane, 3- aminopropyltriethoxy silane, 4-aminobutyltriethoxysilane, p-aminophenyltrimethoxysilane, aminophenyltrimethoxysilane, 3-aminopropyltrimethoxysilane, ω-aminoundecyltrimethoxysilane, and mixtures thereof.

Non-limiting examples of useful epoxy-functional silanes include γ-glycidoxypropyl trimethoxy silane, γ-glycidoxypropylmethoxy dimethoxy silane, (3-glycidoxyproply)bis(trimethylsiloxy)methylsilane, (3-glycidoxypropyl)methyldioxysilane, 3-glycidoxypropyltrimethoxysilane, 2-(3,4-epoxycyclohexyl)ethyltrimethoxysilane, [2-(3,4-epoxy-4-methylcyclohexyl)propyl]-methyldiethoxysilane, and mixtures thereof.

Non-limiting examples of useful fluoro-functional silanes include (3-3-3-triflyoropropyl)methyldimethoxy silane, (3-3-3-trifluoropropyl) trimethoxy silane, and mixtures thereof.

Non-limiting examples of useful acrylo-functional silanes include methacryloxypropenyltrimethoxysilane, 3-methacryloxypropylmethyldiethoxy, 3-methacryloxypropyltrimethoxysilane, 3-acryloxypropylmethylbis(trimethylsiloxy)silane, and mixtures thereof.

Non-limiting examples of useful acetoxy-functional silanes include acetoxypropyltrimethoxysilane.

Non-limiting examples of useful allyl-functional silanes include allyltriethoxysilane.

Non-limiting examples of useful butyl-functional silanes include isobutyltrimethoxysilane, n-butyltrimethoxysilane, and mixtures thereof.

Non-limiting examples of useful chloro-functional silanes include triethoxychlorosilane, 2-chloroethylmethyldimethoxysilane, 2-chloroethyltriethoxysilane, chloromethyltriethoxysilane, p-chlorophenyltrimethylsilane, 3-chloropropylmethyldimethoxysilane, 3-chloropropyltriethoxysilane,3-chloropropyltrimethoxysilane, 2-(4-chlorosulfonylphenyl) ethyltrimethoxysilane. 50% in methylene chloride, and mixtures thereof.

Non-limiting examples of useful cyano-functional silanes include 3-isocyanatrpropyltriethoxy silane, cyanoethyltrimethoxy silane, (cyanomethoylphenethyl)trimethoxysilane, 3-cyanopropyltriethoxysilane, and mixtures thereof.

Non-limiting examples of useful mercapto-functional silanes include (mercaptomethyl)methyldiethoxysilane, 3-mercaptopropylmethyldimethoxysilane, 3-mercaptopropyltrimethoxysilane, 3-mercaptopropyltriethoxysilane, and mixtures thereof.

Non-limiting examples of useful phenyl-functional silanes include methylphenyldiethoxysilane, (r)-nα-phenethyl-n'triethoxysilylpropylurea, n-phenylaminopropyltrimethoxysilane, phenyltriethoxysilane, phenyltrimethoxysilane, and mixtures thereof.

Non-limiting examples of useful vinyl-functional silanes include vinyltriethoxysilane.

It is not necessary that the functional silanes employed all be selected from a specific functional group, although useful silanes are grouped together hereinabove in order to facilitate disclosure. For instance, some reactions can be carried out to provide a random A-B-C block polymer for specialized results, or a pre-formed A-B block can be reacted with a "C" silane to obtain a special repeating structure having a desired positioning of the organic groups. For example, an amino-functionality may be needed for hand or surface modification of a fabric, while an epoxy-functional group may be needed to react with a chemical to improve the durability of the fabric. As an illustrative example, blends of epoxy and amino have been done with unusual results. They are random structures in some cases and, in others, reactions were first carried out with amino, with epoxy added latter, after the initial polymer was built to specification.

The catalysts used in the present invention are basic catalysts. Particularly, the catalysts are sodium or potassium hydroxides. Non-limiting examples of useful catalysts include aqueous sodium hydroxide and aqueous potassium hydroxides solutions, wherein the water is used only to facilitate handling, delivery, and mixing of the catalyst with the other components of the reaction. Particularly preferred catalysts are aqueous sodium hydroxide, containing 50% water by weight, and potassium hydroxide, containing 45% water by weight. The amount of water present in the aqueous catalyst solutions will typically comprise less than about 0.30% of the total weight of the hydroxy-terminated silicone fluid and the silane. Thus, the present polymerization process takes place in a surfactant medium with only negligible, trace amounts of water. Above about 0.30%, the potential exists for cleaving the alcohol from the ethylene oxide chain in the preferred surfactants. Because the reaction under study is an esterification it is conducted in an alkaline state.

Useful surfactant packages may consist of both linear and branched alcohol surfactants, with varying degrees of ethoxylation. The type and amount of surfactant package is chosen dependent upon the temperature of the reaction, the necessity to emulsify the resulting functionalized silicone polymer, and the level of surfactant required for the application method of the final product. The types of surfactant used, such as linear or branched, the degree of ethoxylation, and amounts employed are also dictated by the desired functionalized silicone polymer to be formed, the desired concentration of the final product or products, and the desired performance requirements. Each silicone polymer to be formed may require a slightly different surfactant package for optimum results to be realized.

The surfactant used must be compatible with the resulting functionalized silicone polymer to enable the functionalized silicone polymer to form a stable emulsion. The surfactant system must have an affinity for the silicone polymer as well as for water to the extent that a homogenous solution is to be formed. Thus, the surfactants will typically contain a lipophilic end, which has an affinity for the silicone polymer, and a hydrophilic end, which has an affinity for water. The lipophilic portion of the surfactant must be soluble in the silicone polymer produced, and the moles of ethylene oxide reacted must be high enough to form the emulsion. A hydrophilic lipophilic balance index (HLB index) may be used in choosing a proper surfactant package, wherein the HLB index is the ratio of the lipophilic functionalities to the hydrophilic functionalities within the surfactant package. Typically, a surfactant with an HLB index of from 4 to 16 will be employed as the molecular weight or viscosity of the polymer increases, the surfactant's lipophilic end will need to be adjusted to have a better affinity for the increased MW/viscosity polymer, and therefore polymers of higher molecular weight will require different surfactants. For low molecular weight silicone polymers, tridecyl alcohol surfactants work well, and, as molecular weight increases, nonyl phenol surfactants or high molecular weight branched alcohols should be used.

When an amino-functional silicon emulsion is to be made according to the present invention, preferred alcohol ethoxylate surfactant packages have a HLB value of from about 10.8 to 11.3, depending upon the degree of amino functionality. A particularly preferred surfactant package would include a combination of Tergitol™ TMN-6 and Tomadol™ 91-6. Other particularly preferred alcohol ethoxylate surfactant packages include laryl alcohol ethoxylates and $C_{12}$ and $C_{14}$ chain alcohol ethoxylates, with similar HLB values.

When epoxy- or fluoro-functional silicone emulsions are made according to the present invention, preferred surfactant packages have a HLB value of from about 10.3 to 11.3, depending on the level of epoxy or fluoro functionality. A particularly preferred surfactant package is a combination of tridecyl alcohol, which three moles of ethylene oxide, and tridecyl alcohol, with nine moles of ethylene oxide.

The level of surfactant used in the polymerization is determined by the amount of surfactant required to keep the reaction phase liquid (300–20,000 cs) and emulsify the silicone fluid to the desired final concentration.

The molecular weight or viscosity of the desired final silicone polymer will also affect the type and amount of the surfactant system necessary to form a stable emulsion. This level of surfactant can range from about 5 to about 25% based on the weight of the resulting functionalized silicone polymer to be emulsified and the performance requirements of the emulsion. Silicones used for waterproofing, as an example, require from about 7 to about 12% surfactant to form an emulsion, and must be compatible with other products that could be used in conjunction therewith.

Notably, the surfactant package must be matched with the silane and the final characteristics of the silicone polymer being produced. The degree of ethoxylation will dictate the reaction temperature based upon the cloud point of the surfactants and the ability to emulsify the polymer. As mentioned, the reaction is carried out at a temperature slightly above the cloud point of the surfactant. Thus, the higher the cloud point of the surfactant, the faster and less controllable the reaction. Above the cloud point, the surfactant becomes less water-soluble, or even water insoluble. Above the cloud point, the alcohols exhibit increased solubility in the surfactant, thereby helping to drive the esterification reaction to the desired end point.

The surfactant selection is also based on the reaction temperature needed to react the functional silanes with the hydroxy-terminated silicone fluid. That is, the surfactant cloud point should be at least about 2° C. below this reaction temperature. Preferably, the surfactant cloud point should be from about 2° C. to 20° C. below this reaction temperature, more preferably from about 5° C. to 10° C., and most preferably about 5° C. below this reaction temperature. Choosing a surfactant package based upon this criteria is beneficial because, above the cloud point, the surfactant package tends to act more lipophilic and therefore, allows for and facilitates reaction between the silicone fluid and the functional silane. Also, the surfactant must be able to emulsify the resulting fluid that is polymerized. By staying at just above the cloud point of the reaction, the small amount of water does not interfere with the polymerization of the silicone fluid. Also, this is the point where the surfactant is both water and oil soluble and will help as a viscosity reducer or modifier for the reaction.

When amino-functional silanes are employed, linear or branched alcohol surfactants, or a combination of both linear or branched alcohol surfactants may be chosen as the surfactant package. The amino-functional polymer reactions proceed acceptably with branched surfactants; however, the use of only linear surfactants results in very fast reactions that are difficult to control and generally yield poorer results. The use of a combination of both linear and branched surfactants yields the best results for the amino-functional polymer reactions. Epoxy-functional and fluoro-functional polymer reactions yield the best results when only branched surfactants are employed.

An acid is employed to neutralize the basic catalyst. The acid stops the reaction, helps improve the silicone polymer's dispersability and aids in controlling the emulsion's final viscosity. The reaction of the acid with the basic catalyst forms salts, particularly sodium or potassium salts, which act as electrolytes to aid in developing some polarity in the essentially non-polar environment. Notably, polar compounds are easier to emulsify in water than non-polar compounds. Thus, the neutralizing acids directly affect the solubility or viscosity of the final emulsion.

While any common acid can be used to stop polymenzation and aid in dispersability, it should be noted that acetic acid and formic acid are preferred. Formic acid will aid in the reduction of the emulsion's final viscosity, while acetic acid will be cheaper to use and will be more soluble in the polymerization reaction product.

The polymerization of the silicone fluid and functional silanes occurs in the absence of water. Although, as mentioned above, the catalyst is presented as an aqueous solution containing roughly 50% water, the water content present during the polymerization reaction is negligible in relation to the other components. Thus, the first substantial addition of water is made not with the introduction of the catalyst, but rather to stop the reaction and form the initial emulsion phase. The water addition will also prevent the silane from reacting further due to the hydrolyzing of the methoxy- or ethoxy-terminal groups.

The hydroxyl-terminated silicone fluid is charged to a clean dry vessel at ambient temperature, and agitation is started. The vessels are preferably high quality stainless steel reactors for condensation reactions. However, the reaction can be carried out in glass vessels if appropriate precautions are taken to ensure a controlled reaction, with the understanding that the silicone polymerization will be affected by any surface with similar available site. The silane is charged next, with precautions taken to keep all water or moisture from contaminating the components at this stage. The charge ratio of hydroxy-terminated silicone fluid to silane is determined by the desired degree of functionality on the silicone polymer being formed. Without limitation, the mole ratio of hydroxy-terminated silicone fluid to silane is preferably from about 1000:5 to about 1000:85.

Reactor agitation is achieved preferably by using a radial flow sweep blade configuration with no baffles. However, a traditional axial flow configuration with baffles can be used if the drive system can handle the high viscosity stages that are developed. The silicone fluid and silane must be thoroughly mixed prior to the charging of the catalyst and surfactant package, because a homogeneous mixture is desirable for a consistent polymerization. Also, due to the viscosity built-up during polymerization, the agitation must be adequate to mix the polymer and surfactant mixture after terminating and cooling the polymerization reaction.

The catalyst is charged at a range of from about 0.10% to 0.30% by weight, based upon the hydroxy terminated silicone fluid/silane charge. The surfactant is charged at a range from about 15.0% to 25% by weight, based upon the hydroxy terminated silicone fluid/silane charge. The catalyst and surfactant package should be added separately, with sufficient agitation between each charge.

The temperature required to drive the reaction is targeted to be at least about 2° C. above the cloud point of the surfactant package. Preferably, the temperature is from about 2° C. to about 20° C. above the cloud point, more preferably from about 5° C. to 10° C., and most preferably about 5° C. above the cloud point of the surfactant package. This heat is maintained to drive the reaction and achieve the desired product viscosity, which typically ranges from about 300 to 6000 centipoise, depending upon the silane used and on the degree of functionality produced. This viscosity measurement is derived from the final product, which is composed of the silicone polymer formed and the surfactant package.

After the reaction has proceeded to achieve the desired viscosity, the polymerized silicone and surfactant is cooled to slow or stop the reaction. The reactor is cooled to about 35–40° C. and, at the same time, a small amount of water is charged to hydrolyze the silanes and terminate the reaction. This cooling should be achieved as quickly as possible, on the order of from about at least 0.5° C. per minute.

The catalyst is neutralized with the addition of a corresponding level of an acid. By "a corresponding level of an acid" it is meant the amount of acid required to neutralize the alkali used in the reaction. In the various products producible through the present invention, the acid is useful as an aid to dispersability. Additionally, the epoxy- and fluoro-functional systems should be neutralized to minimize color change and color development.

The addition of the water to the polymer and surfactant mixture transforms the system from an unstable polymer-in-surfactant mixture to a stable oil-in-water system. This will be recognized as a stable emulsion system that is created with at least about 12% by weight of water added at this stage. The final concentration is dictated by application and customer preferences. These final concentrations typically range from about 10 to 88% silicone polymer and surfactant package in water.

As a final adjustment, the product pH may be adjusted to suit the product usage or application method or to enhance stability for special applications. Typically, pH will be adjusted by an acid to a pH of 4.5 to 7.5, although this invention is not to be limited thereto or thereby.

The present method is advantages in that there is a homogeneous combination of the surfactant package and silicone polymer, and the requirements for manufacturing such a polymer are simplified. The present process can be employed in any application or market where hand or feel, surface lubricity, adhesion, or lubricity can be achieved by silicones.

The amino-functional polymers have an increases stability to sheer and require less emulsifier than other methods of emulsifying the same molecular weight polymer. The epoxy-functional polymers require less mechanical energy or milling than required to make comparable emulsions. Additionally, epoxy-functional polymers according to this invention require slightly less emulsifiers.

The fluoro-functional polymers also require less mechanical energy or milling and slightly less emulsifiers, and can be used with other fluoro-chemicals in the market without a loss of performance. Lab evaluations of the fluoro-functional polymers of this invention yield results that indicate a unique property of softening the hand of treated fabric without effecting the soil release performance. Typically, the use of silicone emulsions in soil release processes leads to a loss of performance; however, the fluoro-functional silicones made by the present process display no loss in performance or bath stability. These results do not support the industry perception of silicone emulsions, which holds that they cause problems for soil release properties and finish applications. The fluoro-functional silicone emulsions of this invention change that perception and allow use of silicone systems in several areas of industry where their use was typically not sought as, for example, in soil release applications, water repellent applications with other fluoro-chemicals, and in other barrier fluid applications.

In order to demonstrate the practice of the present invention, the following examples were prepared and tested as set forth below. These examples should not, however, be construed as limiting the present invention. The claims will serve to define the present invention.

In each of the following examples, the amounts of each component used is expressed as a weight percent as based upon the final product produced.

EXAMPLE 1

Amino-Functional Polymer 71.43% of a hydroxy-terminated silicone fluid(Dow Corning 1-3663 ) and 0.72% of (N-(2-aminoethyl)-3-aminopropylmethyldimethoxy silane) (AP Silane-31, available from Advance Polymers) were charged to a 316 stainless steel reactor and mixed for 10 minutes under low agitation with a radial flow sweep blade. Thereafter, 0.14% of an aqueous solution of 50% NaOH in water was charged to the vessel along with 8.66% trimethyl nonanol with 6 moles ethylene oxide (Tergitol TMN-6, available from Union Carbide) and 5.77% C9-15 chain alcohol with 6–8 moles ethylene oxide (Tomadol 91-6, available from Tomah). The vessel was then heated to 60–65° C. and held for one hour, while polymerization proceeded. The cooling of the vessel was then begun and 11.54% water and 1.44% dipropylene glycol were charged. The vessel was brought to 25–30° C. as quickly as possible, and the components were further mixed for 30 minutes. After this 30 minutes of mixing time, 0.29% Glacial acetic acid was charged to neutralized the catalyst. The contents of the vessel were further mixed for one hour, after which the product was directly tested.

| | |
|---|---|
| Appearance = | Clear Water White Liquid |
| % Water (KF) = | 11.20–12.00 |
| pH (100%) = | 6.0–7.0 |
| Viscosity (cps) = | 700–1,000 |

EXAMPLE 2

Epoxy-Functional Polymer 70.40% of a hydroxy-terminated silicone fluid(Dow Corning1-3663) and 2.93% of (γ-glycidoxypropylmethoxy dimethoxy silane) (AP Silane-55, available from Advance Polymer) were charged to a 316 stainless steel reactor and mixed for 10 minutes under low agitation with a radial flow sweep blade. Thereafter, 0.14% of an aqueous solution of 50% NaOH in water was charged to the vessel along with 8.00% Tridecyl Alcohol 9 moles EO and 5.87% Tridecyl Alcohol 3 moles EO. The vessel was then heated to 60–65° C. and held for three hours, while polymerization proceeded. The cooling of the vessel was then begun and 11.74% water. The vessel was brought to 25–30° C. as quickly as possible, and the components were further mixed for 30 minutes. After this 30 minutes of mixing time, 0.12% Glacial acetic acid was charged to neutralized the catalyst. The contents of the vessel were further mixed for one hour, after which the product was directly tested.

| | |
|---|---|
| Appearance = | Clear Water White Liquid |
| % Water (KF) = | 11.20–12.00 |
| pH (100%) = | 7.0–7.5 |
| Viscosity (cps) = | 700–1,000 |

EXAMPLE 3
Fluoro-Functional Polymer 70.40% of a hydroxy-terminated silicone fluid(Dow Corning-3663) and 2.93% of ((3-3-3-trifluoropropyl) trimethoxy silane) (AP Silane-75, available from Advance Polymer) were charged to a 316 stainless steel reactor and mixed for 10 minutes under low agitation with a radial flow sweep blade. Thereafter, 0.14% of an aqueous solution of 50% NaOH in water was charged to the vessel along with 8.00% Tridecyl Alcohol 9 moles EO and 5.87% Tridecyl Alcohol 3 moles EO. The vessel was then heated to 60–65° C. and held for one hours, while polymerization proceeded. The cooling of the vessel was then begun and 11.74% water. The vessel was brought to 25–30° C. as quickly as possible, and the components were further mixed for 30 minutes. After this 30 minutes of mixing time, 0.12% Glacial acetic acid was charged to neutralized the catalyst. The contents of the vessel were further mixed for one hour, after which the product was directly tested.

| | |
|---|---|
| Appearance = | Clear Water White Liquid |
| % Water (KF) = | 11.20–12.00 |
| pH (100%) = | 7.0–7.5 |
| Viscosity (cps) = | 800–1,000 |

What is claimed is:

1. A process for producing a polymerized silicone fluid comprising the steps of:
   charging to a reaction vessel a hydroxy-terminated silicone fluid, an ethoxy-or methoxy-terminated functional silane, a basic catalyst, and a surfactant package having a cloud point of between 2 to 20° C. below the reaction temperature needed to react said functional silane with said hydroxy-terminated silicone fluid; and
   heating the contents of the reaction vessel to a temperature that is about 2 to about 20° C. above the cloud point of said surfactant package to copolymerize said silicone fluid and functional silane; and
   terminating the copolymerization reaction.

2. The process according to claim 1, wherein said surfactant package has a lipophilic portion that is soluble in the copolymer produced.

3. The process according to claim 1, wherein said basic catalyst is selected from aqueous sodium hydroxide, aqueous potassium hydroxide, and mixtures thereof.

4. The process according to claim 1, wherein the mole ratio of hydroxy-terminated silicone fluid to functional silane is in the range of from 1000:5 to 1000:85.

5. The process according to claim 1, wherein the surfactant is charged to the reaction vessel at a range from 15% to 25% by weight, based upon said hydroxy-terminated silicone fluid and functional silane.

6. The process according to claim 1, wherein the catalyst is charged at a range from 0.1% to 0.3% by weight, based upon said hydroxy-terminated silicone fluid and functional silane.

7. The process according to claim 1, wherein the copolymer product of the reaction of said hydroxy-terminated silicone fluid and said ethoxy- or methoxy-terminated functional silane has a viscosity in the range from 300 to 6000 centipoise.

8. The process according to claim 1, wherein said step of terminating includes neutralizing the basic catalyst with an acid, thereby increasing the polarity of the contents of the reaction vessel.

9. The process according to claim 8, further comprising the step of adding water, after said step of neutralizing and agitating to form an emulsion.

10. The process according to claim 9, wherein the emulsion contains from about 10% to 88% by weight of the polymerized silicone fluid and surfactant package in water.

11. The process according to claim 1, wherein said step of heating is to a temperature of about 5° C. to about 10° C. above the cloud point of said surfactant package.

12. The process according to claim 1, wherein said step of heating is to a temperature of about 5° C. above the cloud point of said surfactant package.

13. The process according to claim 1, wherein the process is carried out in the absence of Group VIII metal catalyst.

14. The process according to claim 1, further comprising the step of diluting the product of said terminating step with water to form an emulsion.

* * * * *